(12) United States Patent
Brew et al.

(10) Patent No.: US 12,109,727 B2
(45) Date of Patent: Oct. 8, 2024

(54) HONEYCOMB EXTRUSION DIES AND FORMING METHODS

(71) Applicant: CORNING INCORPORATED, Corning, NY (US)

(72) Inventors: Thomas William Brew, Corning, NY (US); Thomas Mark Dubots, Elmira, NY (US); Kenneth Charles Sariego, Beaver Dams, NY (US); Min Shen, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 408 days.

(21) Appl. No.: 17/608,765

(22) PCT Filed: May 13, 2020

(86) PCT No.: PCT/US2020/032611
§ 371 (c)(1),
(2) Date: Nov. 4, 2021

(87) PCT Pub. No.: WO2020/236474
PCT Pub. Date: Nov. 26, 2020

(65) Prior Publication Data
US 2022/0314489 A1 Oct. 6, 2022

Related U.S. Application Data

(60) Provisional application No. 62/849,367, filed on May 17, 2019.

(51) Int. Cl.
*B28B 3/26* (2006.01)
(52) U.S. Cl.
CPC .................... *B28B 3/269* (2013.01)

(58) Field of Classification Search
CPC ......... B28B 3/269; B29C 48/11; B29C 48/30; B29C 48/345; B29C 48/40
See application file for complete search history.

(56) References Cited

U.S. PATENT DOCUMENTS

| 4,298,328 A | 11/1981 | Frost |
| 4,349,329 A | 9/1982 | Naito et al. |

(Continued)

FOREIGN PATENT DOCUMENTS

| JP | 07-246610 A | | 9/1995 |
| JP | H07246610 | * | 9/1995 |
| WO | 2017/139753 A1 | | 8/2017 |

OTHER PUBLICATIONS

International Search Report and Written Opinion of the International Searching Authority; PCT/US2020/032611; dated Sep. 1, 2020; 13 pages; European Patent Office.

*Primary Examiner* — Jeffrey M Wollschlager
*Assistant Examiner* — Guy F Mongelli
(74) *Attorney, Agent, or Firm* — Kevin M. Able (57) ABSTRACT

A honeycomb extrusion die (120) includes a die body (342) including an inlet face (315) and an outlet face (341). A plurality of pins (330) extend from the die body (342), wherein the pins (330) are arranged to define primary (312P) and secondary slots (312S). Primary slots (312P) include primary slot inlets (320P) and primary slot outlets (312O) and the secondary slots (312S) include secondary slot inlets (312SI) and secondary slot outlets (312SO). Feedholes (317) extend within the die body (342), the feedholes (317) including feedhole outlets (319), wherein the feedhole outlets (319) intersect only with the primary slot inlets (320P). First surface indentation features (345) extend into side surfaces (332) of the plurality of pins (330) defining the primary slots (312P). The first surface indentation features (345) are spaced from the primary slot outlets (312O). The (Continued)

secondary slots (312S) are devoid of surface indentation features. Other die bodies, extruders, and methods are disclosed.

19 Claims, 8 Drawing Sheets

(56) References Cited

U.S. PATENT DOCUMENTS

| | | |
|---|---|---|
| 4,902,216 A | 2/1990 | Cunningham et al. |
| 5,487,863 A | 1/1996 | Cunningham et al. |
| 6,080,348 A | 6/2000 | Shalkey |
| 6,299,813 B1 | 10/2001 | Brew et al. |
| 6,432,249 B1 | 8/2002 | Cunningham et al. |
| 6,989,119 B2 | 1/2006 | Bernas et al. |
| 2006/0103043 A1* | 5/2006 | Rector ............... B29C 48/11 |
| | | 425/467 |
| 2008/0124423 A1 | 5/2008 | Peterson et al. |

* cited by examiner

HONEYCOMB EXTRUSION DIES AND FORMING METHODS

CROSS REFERENCE TO RELATED APPLICATION

This is a national stage application under 35 U.S.C. § 371 of International Application No. PCT/US2020/032611, filed on May 13, 2020, which claims the benefit of priority under 35 U.S.C. § 119 of U.S. Provisional Application No. 62/849,367 filed on May 17, 2019, the content of which is incorporated herein by reference in its entirety.

FIELD

The present disclosure relates to honeycomb extrusion dies used to manufacture honeycomb bodies.

BACKGROUND

Honeycomb extrusion dies are used to extrude honeycomb bodies that can be utilized in exhaust after-treatment systems, such as catalytic converters and particulate filters, for example.

SUMMARY

Embodiments of the disclosure provide honeycomb extrusion dies. A honeycomb extrusion die comprises a die body comprising an inlet face and an outlet face; a plurality of pins disposed in the die body, wherein the pins are arranged to define primary slots and secondary slots, the primary slots comprising primary slot inlets and primary slot outlets, the secondary slots comprising secondary slot inlets and secondary slot outlets; a plurality of feedholes extending within the die body from the inlet face, the feedholes comprising feedhole outlets, wherein the feedhole outlets intersect with the primary slot inlets; first surface indentation features extending into side surfaces of the plurality of pins defining the primary slots, the first surface indentation features spaced from the primary slot outlets; and wherein the secondary slots are devoid of surface indentation features.

In other embodiments, honeycomb extrusion dies are provided. The honeycomb extrusion die comprises a die body comprising an inlet face and an outlet face; a plurality of pins extending from the die body, wherein the pins are arranged to define primary slots and secondary slots, the primary slots comprising primary slot inlets and primary slot outlets, the secondary slots comprising secondary slot inlets and secondary slot outlets, wherein some of the primary slots and some of the secondary slots extend in a first direction, wherein some of the primary slots and some of the secondary slots extend in a second direction, and wherein primary slots extending in the first direction intersect primary slots extending in the second direction at primary intersections; a plurality of feedholes extending within the die body from the inlet face, the feedholes comprising feedhole outlets wherein the feedhole outlets are solely connected to the primary slot inlets at the primary intersections; first indentation features extending into side surfaces of the plurality of pins defining the primary slots, the first indentation features spaced from the primary slot outlets; and second indentation features extending into side surfaces of the plurality of pins defining the primary slots, the second indentation features extending from the primary slot inlets toward the outlet face, wherein the secondary slots are devoid of surface indentation features, and wherein the primary slots extend a first depth from the outlet face, wherein the secondary slots extend a second depth from the outlet face, and wherein the first depth is greater than the second depth.

In other embodiments, a method of manufacturing a honeycomb structure is provided. The method comprises coupling an extrusion die to an extruder, the extrusion die comprising: an inlet face and an outlet face; a plurality of pins, wherein the pins are arranged to define primary slots and secondary slots, the primary slots comprising primary slot inlets and primary slot outlets, the secondary slots comprising secondary slot inlets and secondary slot outlets; a plurality of feedholes extending from the inlet face, the feedholes comprising feedhole outlets, wherein the feedhole outlets are connected to the primary slot inlets; first surface indentation features extending into side surfaces of the plurality of pins defining the primary slots, the first surface indentation features spaced from the primary slot outlets; and second surface indentation features extending into side surfaces of the plurality of pins defining the primary slots, the second surface indentation features extending from the primary slot inlets toward the outlet face, wherein the secondary slots are devoid of surface indentation features. The method can further comprise extruding a batch mixture through the extrusion die.

In another embodiment, a method of manufacturing a honeycomb extrusion die is provided. The method comprises providing a die body comprising an inlet face and an outlet face; forming a plurality of pins in the die body, wherein the pins are arranged to define primary slots and secondary slots, the primary slots comprising primary slot inlets and primary slot outlets, the secondary slots comprising secondary slot inlets and secondary slot outlets; forming a plurality of feedholes extending within the die body from the inlet face, the feedholes comprising feedhole outlets, wherein the feedhole outlets are connected to the primary slot inlets; forming first surface indentation features extending into side surfaces of the plurality of pins defining the primary slots, the first surface indentation features spaced from the primary slot outlets; and forming second surface indentation features extending into side surfaces of the plurality of pins defining the primary slots, the second surface indentation features extending from the primary slot inlets toward the outlet face, wherein the secondary slots are devoid of surface indentation features.

Other embodiments of the disclosure provide an extruder for manufacturing honeycomb bodies. The extruder can comprise an extruder apparatus; a die coupled to the extruder apparatus, the die comprising a die body comprising: an inlet face and an outlet face, a plurality of pins disposed in the die body, wherein the pins are arranged to define primary slots and secondary slots, the primary slots comprising primary slot inlets and primary slot outlets, the secondary slots comprising secondary slot inlets and secondary slot outlets, a plurality of feedholes extending within the die body from the inlet face, the feedholes comprising feedhole outlets, wherein the feedhole outlets are connected to the primary slot inlets, first surface indentation features extending into side surfaces of the plurality of pins defining the primary slots, the first surface indentation features spaced from the primary slot outlets, and second surface indentation features extending into side surfaces of the plurality of pins defining the primary slots, the second surface indentation features extending from the primary slot inlets toward the outlet face, wherein the secondary slots are devoid of first surface indentation features and second surface indentation features.

Additional features of the disclosure will be set forth in the description which follows, and will be apparent from the description, or may be learned by practice of the disclosure. It is to be understood that both the foregoing general description and the following detailed description are explanatory and are intended to provide further explanation of the disclosure.

BRIEF DESCRIPTION OF THE DRAWINGS

The accompanying drawings, which are included to provide a further understanding of the disclosure are incorporated in and constitute a part of this specification, illustrate embodiments of the disclosure, and together with the description serve to explain the disclosure.

DETAILED DESCRIPTION

A honeycomb body comprising a honeycomb structure can be formed by extruding a batch mixture containing inorganic and organic materials, and a liquid vehicle. For example, a suitable batch mixture can comprise ceramic particles or ceramic precursor particles, or both, organic binder, a liquid vehicle (e.g., deionized water), and optionally, a rheology modifier, a pore former, and/or other processing aids. When fired, the extruded batch mixture is transformed or sintered into a porous ceramic material, for example, a porous ceramic honeycomb body suitable for exhaust treatment or other purposes. The porous ceramic material can be cordierite, aluminum titanate, alumina, mullite, silicon carbide, silicon nitride, or the like, and combinations thereof.

The honeycomb structure can be formed by an extrusion process wherein the batch mixture is extruded into a honeycomb body comprising a honeycomb structure, which is then heated to dry and then fire the honeycomb body to form a final ceramic honeycomb body. The extrusion can be performed using any suitable extruder. For example, the extruder can be a hydraulic ram extrusion press or a twin-screw extruder.

Honeycomb extrusion dies employed to produce such honeycomb bodies comprising honeycomb structures can be multi-component assemblies comprising, for example, a wall-forming die body combined with a skin-forming mask. For example, U.S. Pat. Nos. 4,349,329 and 4,298,328 provide examples of extrusion die structures including skin-forming masks. The die body can incorporate feedholes leading to, and intersecting with, a matrix of interconnecting slots formed into the die outlet face, through which the batch mixture is extruded. The extruded batch mixture forms an interconnecting matrix of crisscrossing walls (intersecting cell walls) forming the honeycomb structure.

A honeycomb extrusion die can comprise thousands of feedholes that are formed (e.g., drilled) into a die body of a honeycomb extrusion die. Forming the feedholes can be a significant cost component of manufacturing honeycomb extrusion dies. However, if fewer feedholes were used in a conventional honeycomb extrusion die, the batch material may not spread evenly throughout the slots. In addition, the walls of the extruded honeycomb body may not knit together properly, which may cause anomalies in the honeycomb body.

In view of the above, honeycomb extrusion dies disclosed herein comprise fewer numbers of feedholes than conventional honeycomb extrusion dies of similar configurations. Furthermore, according to embodiments disclosed herein, the flow of batch mixture through the slots is able to be sufficiently balanced to enable knitting of the walls of the honeycomb body during extrusion using the fewer number of feedholes. The honeycomb extrusion dies disclosed herein comprise primary slots and secondary slots that intersect each other (e.g., are directly connected and/or in fluid communication with each other). The primary slots intersect some of the feedholes such at that at least some of the primary slots intersect (are in direct fluid communication and/or are directly connected to) the feedholes. The primary slots can also include surface indentation features (e.g., plenums located proximate the feedholes, and divots located between the plenums and outlet faces of the honeycomb extrusion dies). The secondary slots can be devoid of both plenums and divots, or any other surface indentation feature. Further, in some embodiments the secondary slots do not intersect (are not directly connected) with any feedholes. For example, batch material can instead flow indirectly from a feedhole through at least a portion of a primary slot and then into the second slots. In some embodiments, the secondary slots extend into the die body a shorter distance than the primary slots (i.e., the secondary slots are less deep).

These and other embodiments of honeycomb extrusion dies, methods of manufacturing such honeycomb extrusion dies, extruders including such honeycomb extrusion dies, and methods of manufacturing honeycomb structures using such honeycomb extrusion dies according to the present disclosure are described below with reference to FIGS. 1-4 herein. Like reference numerals used in the drawings identify similar or identical elements throughout the several views. The drawings are not necessarily drawn to scale.

Figure 1:
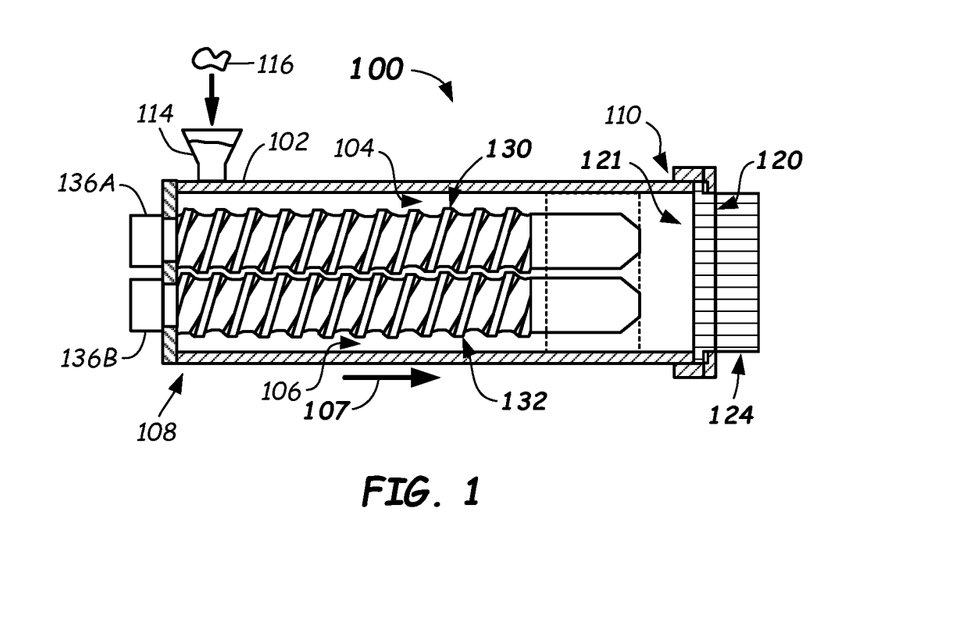
FIG. 1 schematically illustrates a partially-cross sectioned, elevation view of an extruder (e.g., twin-screw extruder) comprising an extrusion die according to embodiments.

Reference is now made to FIG. 1, which shows a cross-sectional side view of an embodiment of an extruder 100 (e.g., a continuous twin-screw extruder). The extruder 100 comprises a barrel 102 including a first chamber portion 104 and a second chamber portion 106 formed therein and in communication with each other. The barrel 102 can be monolithic or it can be formed from a plurality of barrel segments connected successively in a longitudinal (e.g., axial) direction 107. The first chamber portion 104 and the second chamber portion 106 extend through the barrel 102 in the axial direction 107 between an upstream side 108 and a downstream side 110. At the upstream side 108 of the barrel 102, a material supply port 114, which can comprise a hopper or other material supply structure, can be provided for supplying a batch mixture 116 to the extruder 100. A honeycomb extrusion die 120 is provided (e.g., coupled) at a discharge port 121 at the downstream side 110 of the barrel 102 for extruding the batch mixture 116 into a desired shape, such as green honeycomb body 124 comprising a honeycomb structure or the like.

The honeycomb extrusion die 120 can be coupled with respect to the discharge port 121 of the barrel 102, such as at an end of the barrel 102. The honeycomb extrusion die 120 can be preceded by other structures, such as a generally open cavity (not shown), screen/homogenizer (not shown), or the like, e.g., to facilitate the formation of a steady plug-type flow before the batch mixture 116 reaches the honeycomb extrusion die 120.

The extruder 100 can include a pump mechanism configured to force the batch mixture 116 through the honeycomb extrusion die 120. As shown in FIG. 1, a pair of extruder screws are mounted in the barrel 102 and enable the batch mixture 116 to be forced through the honeycomb extrusion die 120. In this embodiment (utilizing a twin-screw assembly), a first screw 130 is rotatably mounted at least partially within the first chamber portion 104 and a second screw 132 is rotatably mounted at least partially within the second chamber portion 106. The first screw 130 and the second screw 132 can be arranged generally parallel to each other, as shown, though optionally they can also be arranged at various angles relative to each other. The first screw 130 and the second screw 132 can also be coupled to one or more driving mechanisms located outside of the barrel 102 for rotation in the same or different directions. It is to be understood that both the first screw 130 and the second screw 132 can be coupled to a single driving mechanism (not shown) or, as shown, to individual driving mechanisms 136A, 136B. The first screw 130 and the second screw 132 move the batch mixture 116 through the barrel 102 with pumping and mixing action in the axial direction 107. Further supporting structure (shown in dotted lines) can be provided to support the first screw 130 and the second screw 132 along their lengths. Such supporting structure can comprise perforations or holes therein to allow the batch mixture 116 to flow there through. While a twin-screw type extruder is shown in FIG. 1, it is to be appreciated that the extruder 100 can comprise other mechanisms or types of extruding apparatus.

Figure 2:
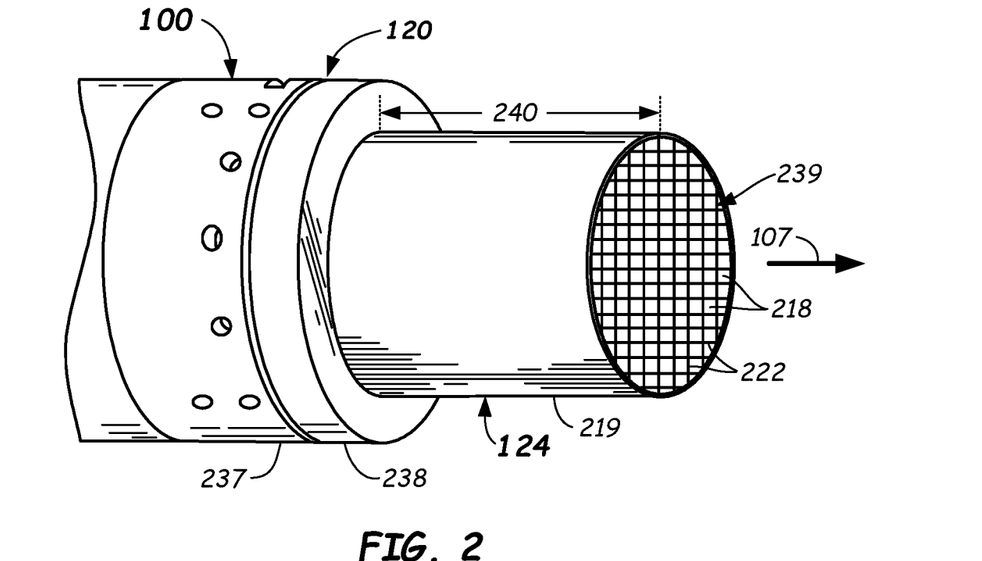
FIG. 2 schematically illustrates an isometric, partial view of an extruder front end and a green honeycomb structure being extruded therefrom according to embodiments.

FIG. 2 illustrates an isometric view of an end of the extruder 100 and the green honeycomb body 124 (e.g., an extrudate) comprising a honeycomb structure being extruded therefrom. The extruder 100 is shown with an extruder front end being where the batch mixture 116 (FIG. 1) exits the extruder 100 as the green honeycomb body 124. An extruder cartridge 237 located proximate the extruder front end can include extrusion hardware such as the honeycomb extrusion die 120 (FIG. 1) and a skin-forming mask 238. The green honeycomb body 124 comprises a first end face 239 and has a length 240 extending between the extruder front end and the first end face 239.

The green honeycomb body 124 can comprise a plurality of channels 218 extending in the axial direction 107 and an outer peripheral surface 219. A plurality of intersecting walls 222 form the channels 218. The cross-sectional shape of the first end face 239 can be circular (as shown), elliptical, ring shaped, square, rectangular, triangular or tri-lobed, hexagonal, octagonal, asymmetrical, symmetrical, other polygonal shapes, or other desired shapes, and combinations thereof. While extrusion is illustrated as being horizontally oriented in FIGS. 1 and 2, this disclosure is not so limited and extrusion can be horizontal, vertical, at some combination or incline thereto.

Average cell density of the green honeycomb structure of the green honeycomb body 124 can be any suitable range, such as in a range from about 100 cells per inch$^2$ (cpsi) to about 800 cells per inch$^2$ (cpsi) (between about 15.5 and 124.0 cells per cm$^2$). In some embodiments, the cell density is in a range from about 380 cpsi to about 620 cpsi (about 61 cells per cm$^2$ to about 99 cells per cm$^2$). The intersecting walls 222 can have transverse wall thicknesses in any desired range, such as ranging from about 2 mils to about 5 mils (about 0.051 mm to about 0.13 mm). For example, the geometry of the green honeycomb structure of the green honeycomb body 124 can have an average cell density of about 400 cells per in$^2$ (about 62 cells per cm$^2$) with a wall thickness of about 4 mils (about 0.10 mm). Another geometry of the green honeycomb structure of the green honeycomb body 124 can have an average cell density of about 600 cpsi (about 93 cells per cm$^2$) with a wall thickness of about 3 mils (about 0.077 mm). Other geometries of the green honeycomb structure of the green honeycomb body 124 can be used.

Upon exiting the extruder 100 in the axial direction 107, the green honeycomb structure of the green honeycomb body 124 may stiffen. The green honeycomb body 124 can be cut or otherwise formed into a final honeycomb body of a desired length. For example, the green honeycomb body 124 can be cut to length and can be dried and fired to form a final honeycomb body.

Figure 3A:
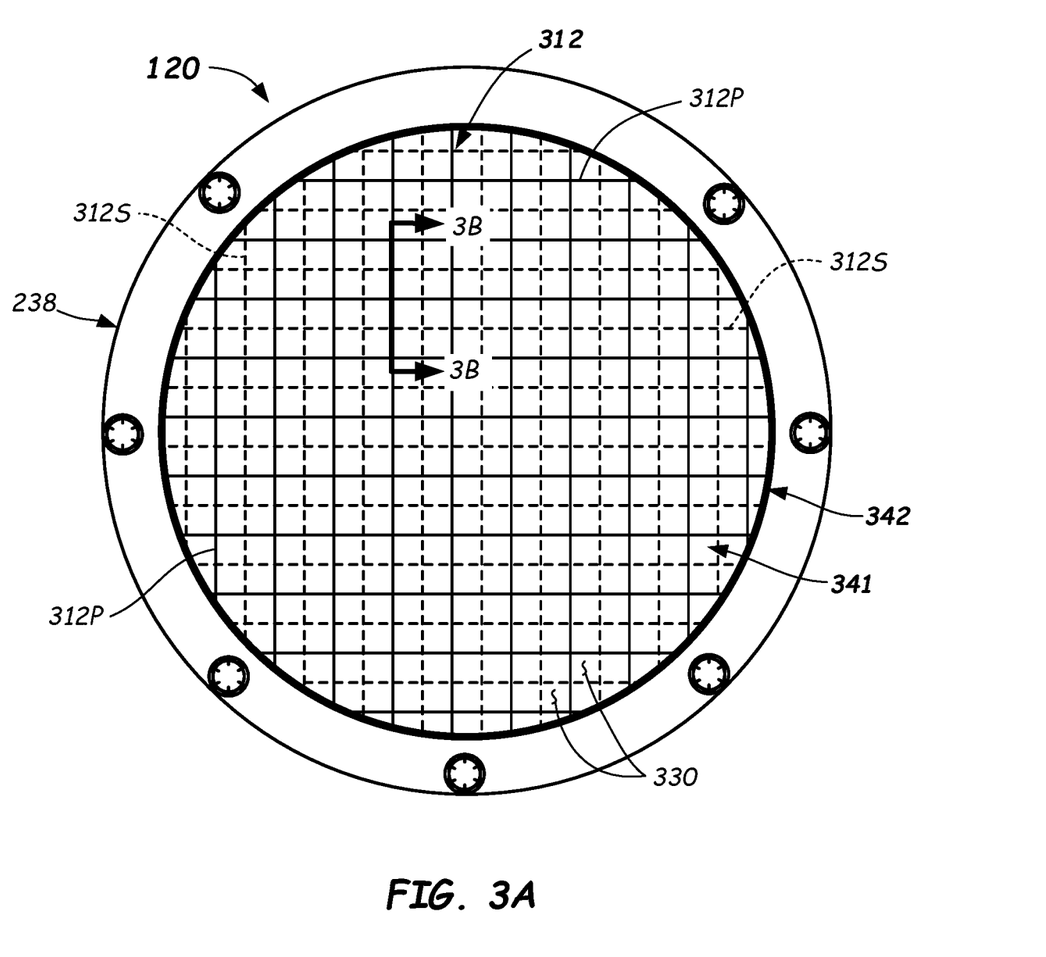
FIG. 3A schematically illustrates a front, end view of an extruder comprising a honeycomb extrusion die according to embodiments.
Figure 3B:
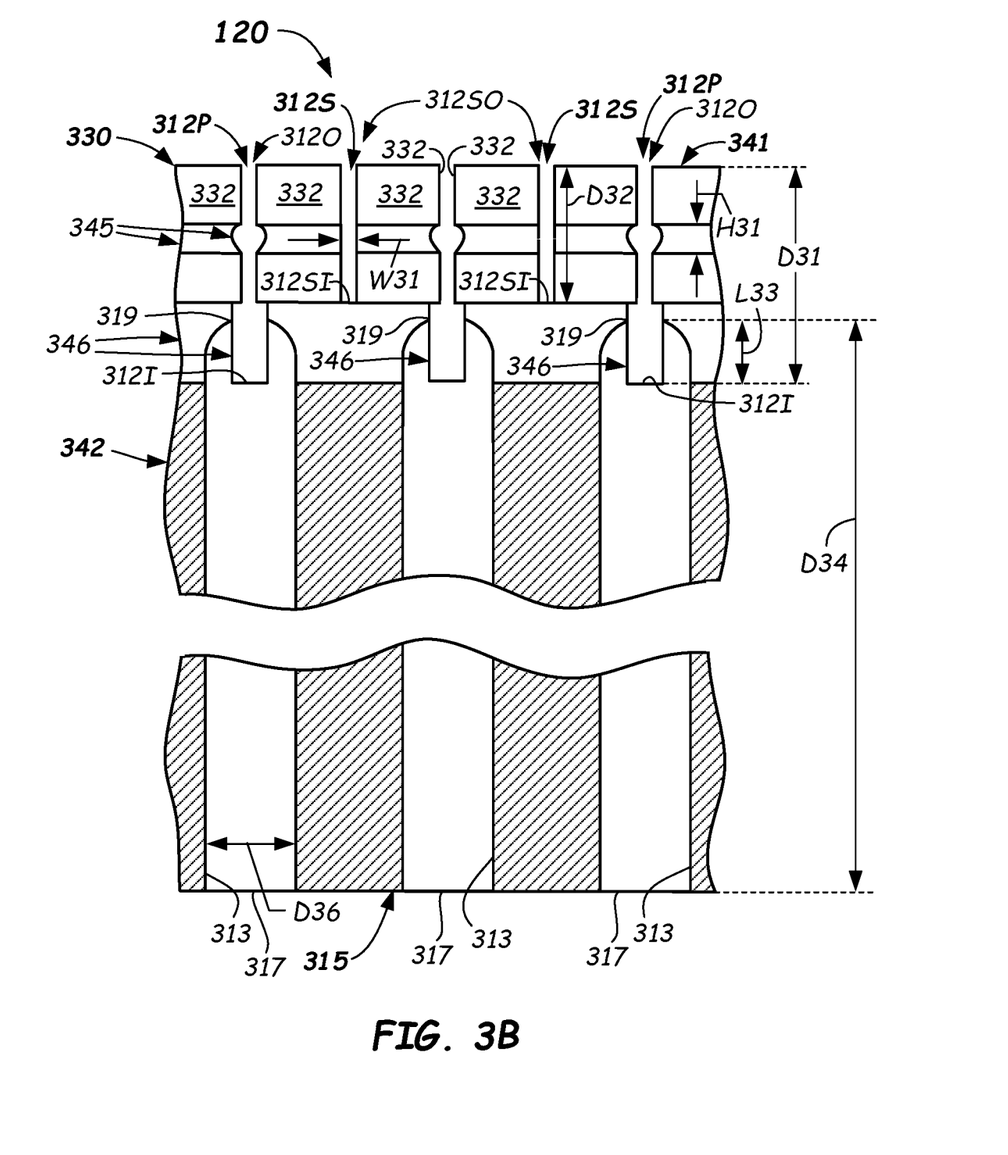
FIG. 3B schematically illustrates a partial, cross-sectioned view of a honeycomb extrusion die comprising divots and plenums in side surfaces of pins forming slots according to embodiments.
Figure 3C:
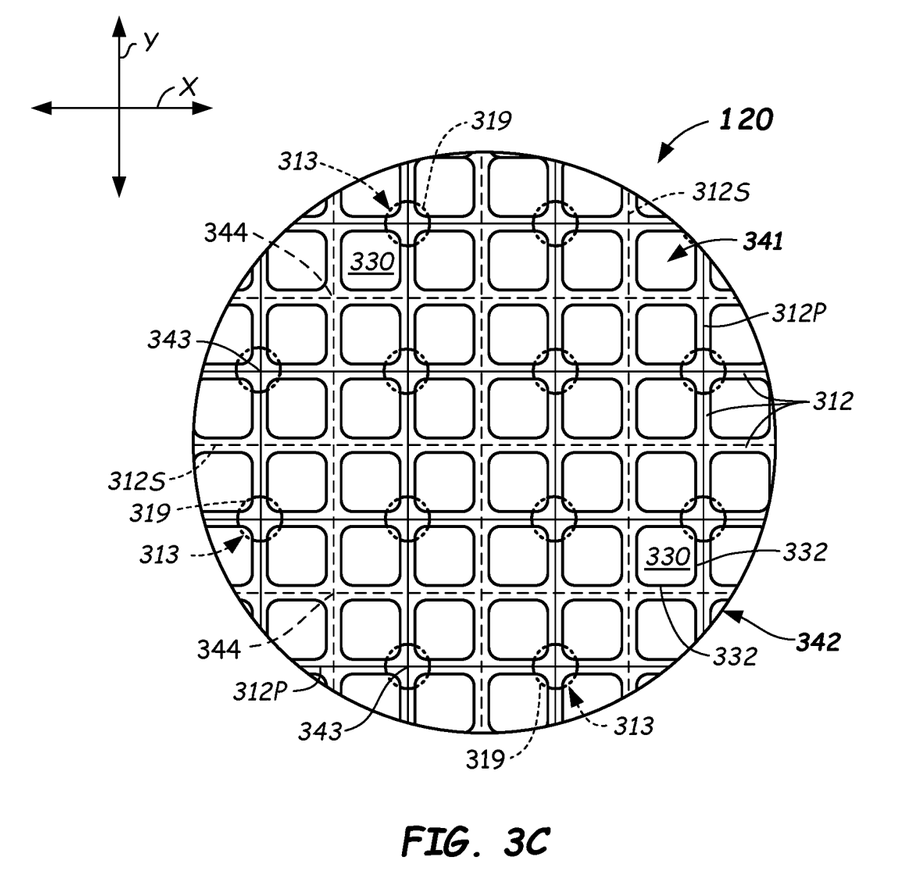
FIG. 3C schematically illustrates a front, plan view of a portion of a honeycomb extrusion die with a first feedhole pattern according to embodiments.
Figure 3D:
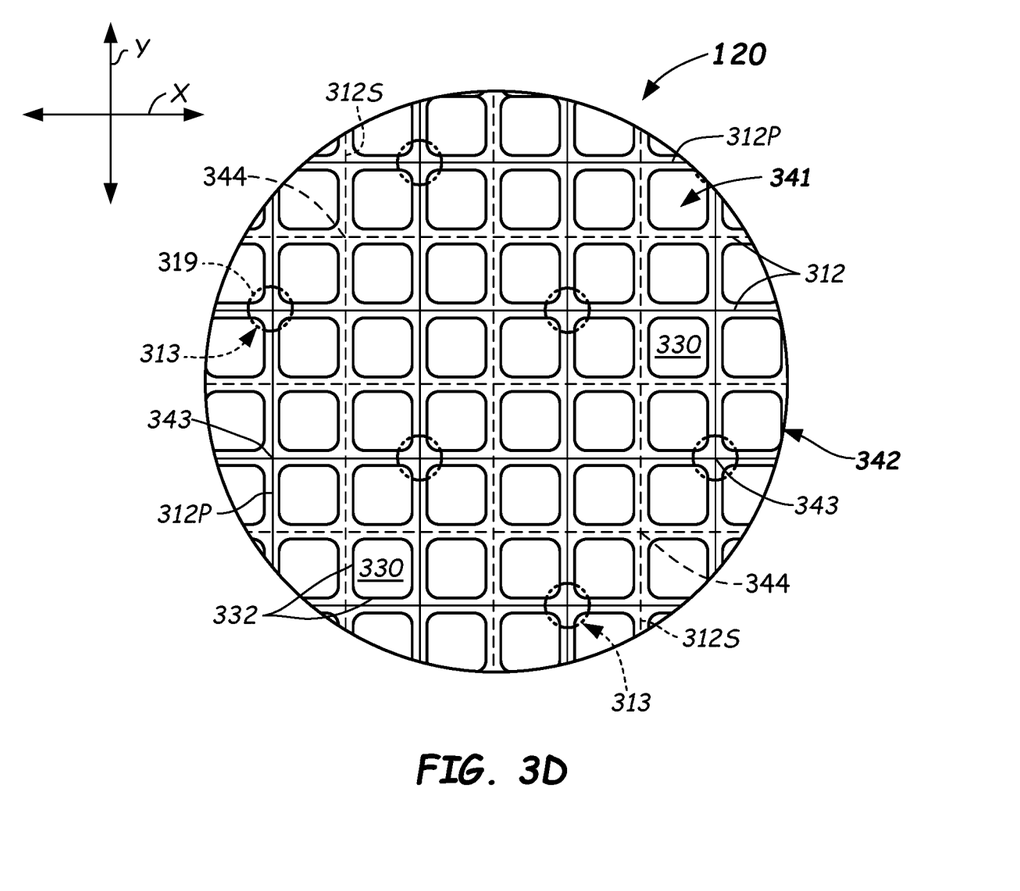
FIG. 3D schematically illustrates a front, plan view of a portion of a honeycomb extrusion die with a second feedhole pattern according to embodiments.
Figure 3E:
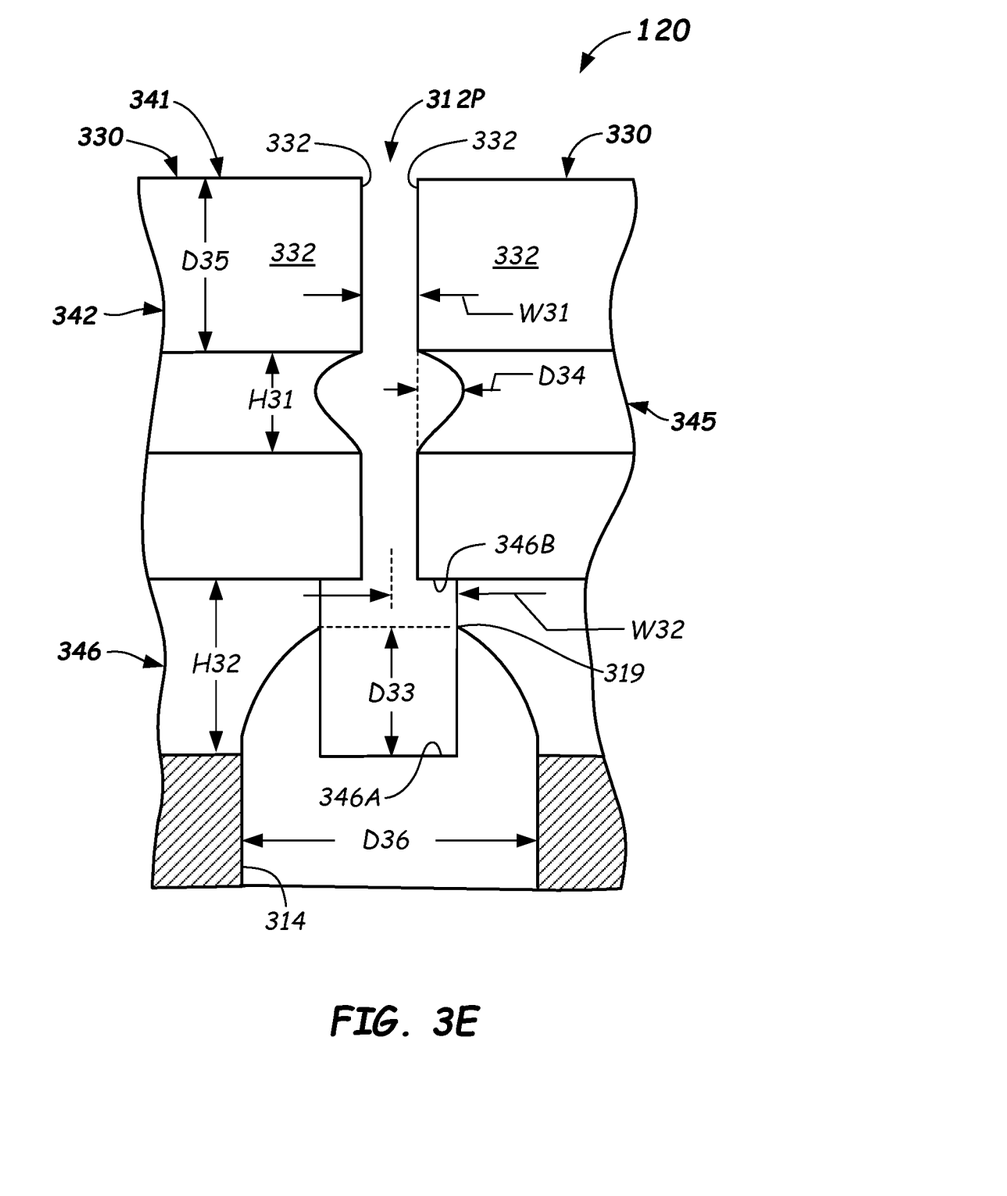
FIG. 3E schematically illustrates a cross-sectioned, side view of a portion of side surfaces of pins in a honeycomb extrusion die forming a slot, the side surfaces including plenums and divots according to embodiments.

Reference is now made to FIGS. 3A-3E, which illustrate detailed views of embodiments of the honeycomb extrusion die 120. FIG. 3A illustrates a front-end view of an embodiment of the honeycomb extrusion die 120 showing an outlet face 341. FIG. 3B illustrates a partial, cross-sectioned view of the honeycomb extrusion die 120 taken generally along line 3B-3B in FIG. 3A. FIG. 3C illustrates an enlarged front view of a portion of the outlet face 341 of the honeycomb extrusion die 120 showing an embodiment of a first feedhole pattern. FIG. 3D illustrates an enlarged front view of a portion of the outlet face 341 of the honeycomb extrusion die 120 showing an embodiment of a second feedhole pattern. In some embodiments, the views of FIGS. 3C and 3D represent at least central portions of the outlet face 341 of the honeycomb extrusion die 120 (portions proximate the periphery of the outlet face 341 can differ from the central portion if desired, e.g., comprise widened slots). FIG. 3E illustrates a partial, cross-sectioned view of two pins of the honeycomb extrusion die 120.

The honeycomb extrusion die 120 can comprise an inlet face 315 (FIG. 3B) located opposite the outlet face 341. A skin-forming mask 238 (FIG. 3A) can be located proximate the outlet face 341 and define the outer peripheral surface 219 (e.g., skin—FIG. 2). The honeycomb extrusion die 120 can further comprise a die body 342 comprising a matrix of intersecting slots 312 (a few labelled) extending into the die body 342 from the outlet face 341. Die body 342 can be manufactured from any suitable material, such as a tool steel or other metal. The intersecting slots 312 comprise primary slots 312P (shown as solid lines in FIGS. 3A, 3C, and 3D) and secondary slots 312S (shown as dashed lines in FIGS. 3A, 3C, and 3D). The primary slots 312P can intersect (e.g., are directly connected or in direct fluid communication) with feedholes 313, while the secondary slots 312S do not intersect (e.g., are not directly connected or in direct fluid communication) with the feedholes 313. The terms "intersect", "direct fluid communication", and "directly connected" include fluid communications between feedholes 313 and primary slots 312P without intervening fluid transmission structures. The term "not directly connected" includes fluid communications between feedholes 313 and secondary slots 312S with intervening fluid transmission structures, such as primary slots 132P.

The honeycomb extrusion die 120 can also comprise a plurality of feedholes 313 (FIG. 3B) that comprise feedhole inlets 317 and feedhole outlets 319. The feedhole outlets 319 of the feedholes 313 can be in direct fluid communication with and connected to the primary slots 312P. For example, referring to FIGS. 3C and 3D, only the intersections of the primary slots 312P intersect the feedhole outlets 319.

As shown in the embodiments of FIGS. 3C and 3D, some of the primary slots 312P and some of the secondary slots 312S extend in a first direction (e.g., an x-direction). Other ones of the primary slots 312P and the secondary slots 312S extend in a second direction (e.g., a y-direction). The x-direction and y-direction can be orthogonal with respect to each other, or at some other transverse angle. The primary slots 312P can intersect aligned at the location of feedholes 313 (a few labeled) with respect to the axial direction 107. In some embodiments, the feedholes 313, and thus the feedhole outlets 318, only intersect the primary slots 312P at the primary intersections 343. Secondary slots 312S can intersect at secondary intersections 344 (a few labelled), which are not aligned with feedholes 313 with respect to the axial direction 107.

In some conventional honeycomb extrusion dies, the feedholes are located at alternating slot intersections. Rows of feedholes in traditional honeycomb extrusion dies can be staggered, so feedholes are located at every other slot intersection in both X-directions and Y-directions. In contrast, as shown in FIG. 3C, in the present disclosure, the primary slots 312P and the secondary slots 312S alternate in both the first direction and the second direction and be interspersed with one another. In the embodiment of FIG. 3C, the primary intersections 343 are located at every other slot intersection and a feedhole 313 is located at every primary intersection 343. Accordingly, the number of feedholes 313 is reduced, e.g., by 50% relative to conventional honeycomb extrusion dies. In the embodiment of FIG. 3D, feedholes 313 are located at every other one of the primary intersection 343. Accordingly, the number of feedholes 313 is further reduced, e.g., by 75% relative to conventional honeycomb extrusion dies.

In some embodiments, the primary slots 312P have a depth D31 (FIG. 3B) extending between primary slot inlets 312I and primary slot outlets 312O. The secondary slots 312S have a depth D32 extending between secondary slot inlets 312SI and secondary slot outlets 312SO. As shown in FIG. 3B, the primary slots 312P extend deeper into the die body 342 from the outlet face 341 than the secondary slots 312S. For example, the depth D31 can be greater than the depth D32. In some embodiments, the depth D31 is in a range from 0.11 inch to 0.20 inch (2.8 mm to 5.1 mm), for example. In some embodiments, the depth D31 is in a range from 0.16 inch to 0.20 inch (4.1 mm to 5.1 mm) or in a range from 0.17 inch to 0.19 inch (4.3 mm to 4.8 mm), for example. In some embodiments, the depth D32 is in a range from 0.07 inch to 0.135 inch (1.8 mm to 3.4 mm), for example. In some embodiments, the depth D32 is in a range from 0.105 inch to 0.125 inch (2.67 mm to 3.18 mm) or in a range from 0.08 inch to 0.10 inch (2.0 mm to 2.54 mm) or in a range from 0.08 inch to 0.125 inch (2.0 mm to 3.18 mm), for example. The primary slots 312P and the secondary slots 312S can have other depths.

In some embodiments, the secondary slots 312S do not extend into the die body 342 to the depths required to intersect with the feedholes 313. However, the primary slots 312P extend to depths in the die body 342 so that the primary slot inlets 320P intersect with the feedholes 313. For example, there can be an overlap length L33 (sometimes referred to as a "feedhole overlap") between the feedholes 313 and the primary slots 312P. In some embodiments, the overlap length L33 is in a range from 0.03 inch to 0.04 inch (0.76 mm to 1.0 mm), for example. In some embodiments, the overlap length L33 is in a range from 0.034 inch to 0.036 inch (0.86 mm to 0.91 mm), for example.

The die body 342 comprises a plurality of pins 330 (a few labelled), wherein the pins 330 comprise one or more side surfaces 332. The pins 330 shown have four side surfaces, with radiuses on the corners thereof, although other shapes and configurations are possible. The pins 330 are arranged so that the opposing side surfaces 332 of adjacent ones of pins 330 form the plurality of intersecting slots 312. The side surfaces 332 of the pins 330 defining the slots 312 can be coated with a coating layer (not shown), such as a wear reducing coating. In the embodiments depicted in FIGS. 3A-3E, the pins 330 can be square-shaped when viewed in transverse cross-section. The shape of the pins defines the shape of the corresponding channels of the honeycomb extrudate, e.g., the pins 330 of square shape form the channels 218 of square-shape (FIG. 2) when viewed in transverse cross section. In other embodiments, the pins 330 have different shapes in transverse cross-section, such as triangular and rectangular. The pins 330 can include slightly curved portions of the side surfaces when viewed in transverse cross-section, as well as corner radiuses.

The pins 330 can have any desired pin density, generally corresponding to the resulting cell density of the cells of the extruded honeycomb body. In some embodiments, the pins 330 have a pin density on the outlet face 341 in a range from 100 to 800 pins per inch$^2$ (between 15.5 pins per cm$^2$ and 124.0 pins per cm$^2$). In some embodiments, the pins 330 have a pin density on the outlet face 341 in a range from 380 pins per in$^2$ to 620 pins per in$^2$ (58.9 pins per cm$^2$ to 96.1 pins per cm$^2$). The pins 330 can have other pin densities on the outlet face 341.

The widths of the secondary slots 312S can be uniform between the secondary slot inlets 312SI and the secondary slot outlets 312SO. For example, in some embodiments the secondary slots 312S do not comprise any surface indentation features therein (such as divots, plenums or other surface indentation features) between the secondary slot inlets 312SI and the secondary slot outlets 312SO. Accordingly, the side surfaces 332 of the pins 330 forming the secondary slots 312S can be flat and planar and devoid of surface indentation features. The secondary slots 312S have secondary slot widths W31 extending between adjacent ones of side surfaces 332 of adjacent ones of the pins 330. The slot widths described herein can be the widths of coated slots or uncoated slots (when used uncoated). In some embodiments, the secondary slot widths W31 is in the range from 0.002 inch to 0.012 inch (0.051 mm to 0.30 mm), for example. In some embodiments, the secondary slot widths W31 is in the range from 0.004 inch to 0.005 inch (0.102 mm to 0.127 mm) or in the range from 0.0033 inch to 0.0043 inch (0.0838 mm to 0.109 mm), for example. Other suitable secondary slot widths W31 can be used.

At least some of the side surfaces 332 of one or more pins 330 forming the primary slots 312P can comprise divots 340 (e.g., first surface indentation features) and/or plenums 346 (e.g., second surface indentation features). Additional reference is made to FIG. 3E, which illustrates an enlarged view of the die body 342 comprising two pins 330 with divots 345 and plenums 346. The divots 345 can be indentations into the side surfaces 332 of the pins 330 wherein the slot widths W31 directly above and directly below the divots 340 are equal or within 10% of each other. The primary slots 312P can have the same slot widths W31 as the secondary slots 312S except for regions of the divots 345 and plenums 346. One or more of the divots 345 can be spaced from both the primary slot inlets 312I and the primary slot outlets 312O and have a divot height H31 extending in a direction between the primary slot inlets 312I and the primary slot outlets 312O. The divot height H31 can be in a range from 0.004 inch to 0.006 inch (0.10 mm to 0.15 mm), for example. In other embodiments, the height H31 are in a range from 0.0045 inch to 0.0055 inch (0.11 mm to 0.14 mm), for example.

The divots 345 can extend to a depth D34 (FIG. 3E) into the side surfaces 332 of the pins 330. In some embodiments, the depth D34 is in a range from 0.009 inch to 0.013 inch (0.23 mm to 0.33 mm), for example. In other embodiments, the depth D34 is in a range from 0.010 inch to 0.012 inch (0.25 mm to 0.030 mm), for example. In some embodiments, the depth D34 is about 0.011 inch (about 0.28 mm), for example. The top of the divots 345 can be located at distance D35 from the outlet face 341, which may be referred to as the divot to pin top distance. In some embodiments, the distance D35 is in the range from 0.03 inch to 0.058 inch (0.76 mm to 1.5 mm), for example. In other embodiments, the distance D35 is in the range of 0.035 inch to 0.045 inch (0.89 mm to 1.1 mm), for example. In other embodiments, the distance D35 is in the range from 0.043 inch to 0.053 inch (1.1 mm to 1.3 mm), for example. In other embodiments, the distance D35 is about 0.04 inch (about 1.0 mm) or about 0.048 inch (about 1.2 mm), for example.

The plenums 346 can be portions of the deepest parts of the primary slots 312P. For example, inlet portions of the plenums 346 can intersect, e.g., be connected to or be in direct fluid communication with, the feedholes 313. The plenums 346 can be located upstream relative to the divots 345 in primary slots 312P. For example, the plenums 346 can be closer to the feedholes 313 than the divots 345. In a like manner, the divots 345 can be downstream from the plenums 346. For example, the divots 345 can be closer to the outlet face 341 than the plenums 346.

The plenums 346 have a height H32 that, in some embodiments, extends into the feedholes 313 between first ends 346A located proximate the primary slot inlets 312I and second ends 342B located opposite the first ends 346A. In some embodiments, the height H32 is in a range from 0.035 inch to 0.09 inch (0.89 mm to 2.3 mm), for example. In some embodiments, the height H32 is in a range from 0.035 inch to 0.045 inch (0.89 mm to 1.4 mm), for example. In some embodiments, the height H32 is in a range from 0.07 inch to 0.09 inch (1.8 mm to 2.3 mm), for example. The plenums 346 have a half width W32 measured from a midsection of the primary slots 312P. The half width W32 can be in a range from 0.006 inch to 0.009 inch (0.15 mm to 0.24 mm), for example. In some embodiments, the half width W32 is in a range 0.006 inch to 0.008 inch (0.15 mm to 0.20 mm), for example. In some embodiments, the half width W32 is in a range from 0.007 inch to 0.009 inch (0.18 mm to 0.24 mm), for example.

As described above, in some embodiments the secondary slots 312S do not extend into the die body 342 as far as the primary slots 312P. The shallower secondary slots 312S can be useful to reduce or eliminate interference of the batch material in the plenums 346. For example, the secondary slots 312S can extend to a depth D32, which is as deep enough to intersect with the top of the plenums 346. For example, the secondary slots extending in a first direction (e.g., x-direction) intersect with the plenums of primary slots extending in a second direction (e.g., y-direction) transverse to the first direction, while the secondary slots extending in the second direction (e.g., y-direction) intersect with plenums of the primary slots extending in the first direction (e.g., x-direction). The depth D32 of the secondary slots 312S into the die body 342 can be deep enough to receive the batch mixture 116 without drawing excessive amounts of the batch mixture 116 from the primary slots 312P.

The feedholes 313 have a diameter D36 (e.g., a transverse width—FIG. 3E). In some embodiments, the diameters D36 are dependent on the density of the pins 330 in addition to other variables. In some embodiments, the diameter D36 is in a range from 0.0430 inch to 0.120 inch (1.14 mm to 3.05 mm). In some embodiments, the diameter D36 is in a range from 0.08 inch to 0.12 inch (2.03 mm to 3.05 mm). In some embodiments, the diameter D36 is in a range from 0.0547 inch to 0.088 inch (1.39 mm to 2.24 mm). In some embodiments, the diameter D36 is in a range from 0.064 inch to 0.10 inch (1.63 mm to 2.54 mm). In some embodiments, the diameter D36 is in a range from 0.0430 inch to 0.0736 inch (1.09 mm to 1.87 mm). The embodiment of FIGS. 3B-3C can have smaller feedholes 313 than the embodiment of FIG. 3D.

Table 1 provides some dimensions of four example die bodies including different cell densities, slot widths, and the percent fewer number of feedholes (feedhole number reduction) than used in a comparative conventional honeycomb extrusion die. Table 1 includes feedholes 313 that have larger and smaller diameters D36 for a total of eight different die bodies. Because fewer feedholes 313 are used, the diameters D36 of the feedholes 313 can be increased (relative to the comparative conventional extrusion dies) and strength of the die body 342 can be maintained to minimize deflection of the die body 310 during extrusion. For example, the deflection of the die bodies described herein may be equivalent to the deflection of conventional die bodies even when larger diameters D36 of the feedholes 313 are used. The larger diameters D36 of the feedholes 313 can further enable the die pressure, which is the pressure of the batch mixture 116 (FIG. 1) during extrusion, to be reduced relative to traditional honeycomb extrusion dies. The pin densities can be approximately the same as cell densities of the green honeycomb body 124 (e.g., accounting for any shrinkage or growth of the green honeycomb body 124 as it is dried and fired). Table 1 includes "pin spacing", which is a distance from a center of a first one of the pins 330 to a center of an adjacent one of the pins 330.

TABLE 1

| | Examples | | | |
|---|---|---|---|---|
| Example | 1 | 2 | 3 | 4 |
| Pin density (pins/in$^2$) | 400 | 400 | 600 | 600 |
| (pins/cm$^2$) | (62) | (62) | (93) | (93) |

TABLE 1-continued

Examples

| Example | 1 | 2 | 3 | 4 |
|---|---|---|---|---|
| Feedhole % reduction | 75% | 50% | 75% | 50% |
| Pin spacing (in) | 0.053 | 0.053 | 0.0425 | 0.0425 |
| (mm) | (1.3) | (1.3) | (1.08) | (1.08) |
| Slot width W31 (in) | 0.0045 | 0.0045 | 0.0038 | 0.0038 |
| (mm) | 0.11 | 0.11 | 0.10 | 0.10 |
| Feedhole diameter D36-small (in) | 0.09 | 0.0647 | 0.074 | 0.053 |
| (mm) | (2.29) | (1.64) | (1.88) | (1.35) |
| Feedhole diameter D36-large (in) | 0.11 | 0.078 | 0.09 | 0.0636 |
| (mm) | (2.79) | (1.98) | (2.29) | (1.62) |

During extrusion, batch mixture 116 (FIG. 1) enters the feedhole inlets 317 under pressure provided by the extruder 100 (FIG. 1). The batch mixture 116 is discharged at the feedhole outlets 319 where the batch mixture 116 enters the primary slot inlets 312I and flows through the plenums 346. The plenums 346 reduce the impedance of the primary slots 312P proximate the plenums 346, which enables the batch mixture 116 to travel along the plenums 346 and flow into the secondary slots 312S. The divots 345 in the primary slots 312P provide impedance in the primary slots 312P proximate the divots 345. The increased impedance provided by the divots 345 forces the batch mixture 116 to travel along the divots 345 and into the secondary slots 312S. As described above, in some embodiments, the secondary slots 312S do not extend from the outlet face 341 into the die body 342 as deep as the primary slots 312P. Because the secondary slot depth D32 is less than the primary slot depth D31, the batch mixture 116 flows from the plenums 346 (of the primary slots 312P) into the secondary slots 312S. In addition, there is batch mixture 116 remaining to flow through the primary slots 312P. The inclusion of surface indentation features (e.g., the divots 345 and the plenums 346) in the primary slots but not in the secondary slots can also be useful for balancing the flow of batch mixture 116 through both the primary slots 312P and the secondary slots 312S at the outlet face 341. For example, despite only the primary slots intersecting with the feedholes 313, the velocities of the batch mixture 116 in the primary slots 312P and the secondary slots 312S can be equal or substantially equal, which enables the batch mixture 116 in the primary slots 312P and the secondary slots 312S to knit together and form the green honeycomb body 124 including the honeycomb structure (FIG. 2).

Table 2 shows the performance data of the four example extrusion dies of Table 1. Die pressures are shown for an extrusion rate of 1.5 in/sec (3.8 cm/sec). In addition, example die sensitivity (dV %) values are provided. Die sensitivity provides a value for the difference in batch mixture flow rates between the intersecting slots 312. The die sensitivity (dV %) is calculated as the difference in batch mixture flow rates at two different pressures divided by the average batch mixture flow rate and multiplied by 100. Each of the example dies of Table 2 have die sensitivities of less than 4%. Under fully balanced flow circumstances, the die sensitivity would be zero or close to zero.

TABLE 2

Example dies

| Example Die | Die Slot Design/Feedhole Dia. | Feedhole pattern | Die pressure at 1.5 in/s [psi] | dV % |
|---|---|---|---|---|
| 400/4 | Divot only/0.055" | Comparative | 2295.14 | 1.01E−03 |
| 2 | 0.078" (1.98 mm) | 50% reduced | 1589.1 | 4.71E−05 |
| 2 | 0.0647" (1.64 mm) | 50% reduced | 1734.66 | 5.49E−05 |
| 1 | 0.11" (2.79 mm) | 75% reduced | 1552.66 | 9.60E−01 |
| 1 | 0.09" (2.29 mm) | 75% reduced | 1660.15 | 2.28E+00 |
| 600/3 | Divot only/0.045" | Comparative | 2103.17 | 2.15E−04 |
| 4 | 0.0636" (1.62 mm) | 50% reduced | 1688.13 | 2.38E−05 |
| 4 | 0.053" (1.35 mm) | 50% reduced | 1862.63 | 1.58E−05 |
| 3 | 0.09" (2.29 mm) | 75% reduced | 1622.81 | 3.66E+00 |
| 3 | 0.074" (1.88 mm) | 75% reduced | 1748.77 | 2.47E+00 |

Table 2 illustrates a plurality of honeycomb extrusion dies 120 of 400/4 and 600/3 cpsi/twall configurations (where twall is the approximate wall thickness of the resulting honeycomb body and/or the slot width of the die) wherein die pressures can be reduced as compared to conventional dies (400/4 and 600/3) that includes only a divot (no plenum), while still retaining die sensitivity (DV %) of less than 4% and also reducing the number of feedholes 313. Thus, advantageously, die pressure can be reduced, feedhole manufacturing cost of the feedholes 313 can be reduced because of the reduced number, machining time and tool costs can be reduced, while still retaining acceptable die sensitivity and knitting of the ware.

Figure 4:
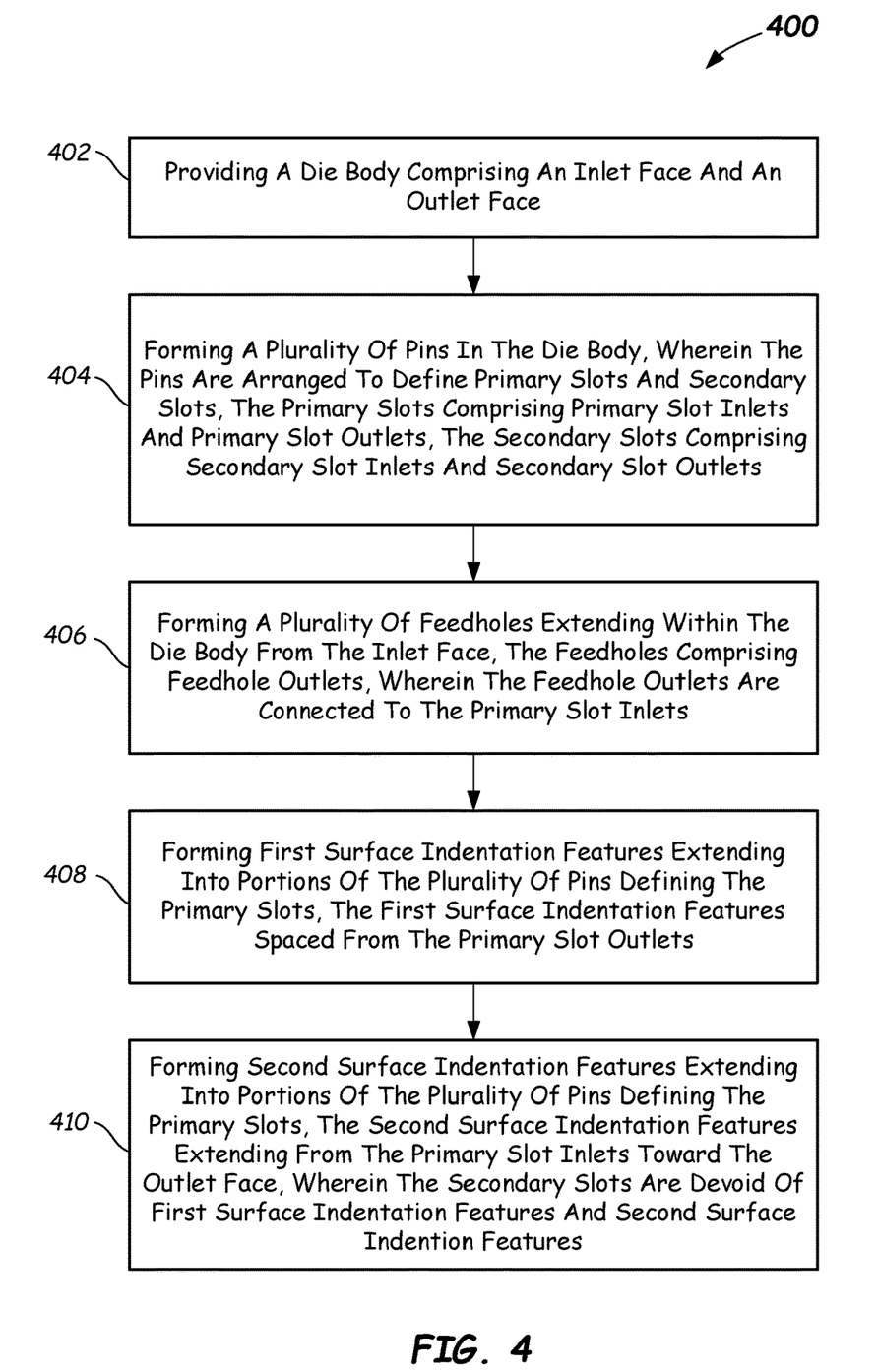
FIG. 4 illustrates a flowchart describing a method of manufacturing a honeycomb extrusion die of FIGS. 1-3E according to embodiments.

In another aspect, a method of manufacturing a honeycomb extrusion die (e.g., honeycomb extrusion die 120) is provided and is described in the flowchart of FIG. 4. The method 400 includes, at step 402, providing a die body (e.g., die body 342) comprising an inlet face (e.g., inlet face 315) and an outlet face (e.g., outlet face 341). The method includes, at step 404, forming a plurality of pins (e.g., pins 330) in the die body, wherein the pins are arranged to define primary slots (e.g., primary slots 312P) and secondary slots (e.g., secondary slots 312S), the primary slots comprising primary slot inlets (e.g., primary slot inlets 312I) and primary slot outlets (e.g., primary slot outlets 312O), the secondary slots comprising secondary slot inlets (e.g., secondary slot inlets 312SI) and secondary slot outlets (e.g., secondary slot outlets 320SO). The method 400 includes, at step 406, forming a plurality of feedholes (e.g., feedholes 313) extending within the die body from the inlet face, the feedholes comprising feedhole outlets (e.g., feedhole outlets 319), wherein the feedhole outlets are connected to the primary slot inlets. The method 400 includes, at step 408, forming first surface indentation features (e.g., divots 345) extending into portions (e.g., sides) of the plurality of pins defining the primary slots, the first surface indentation features spaced from the primary slot outlets. The method 400 includes, at step 410, forming second surface indentation features (e.g., plenums 346) extending into portions (e.g., base portions) of the plurality of pins defining the primary slots, the second surface indentation features extending from the primary slot inlets toward the outlet face, wherein the secondary slots are devoid of first surface indentation features and second surface indention features.

Figure 5:
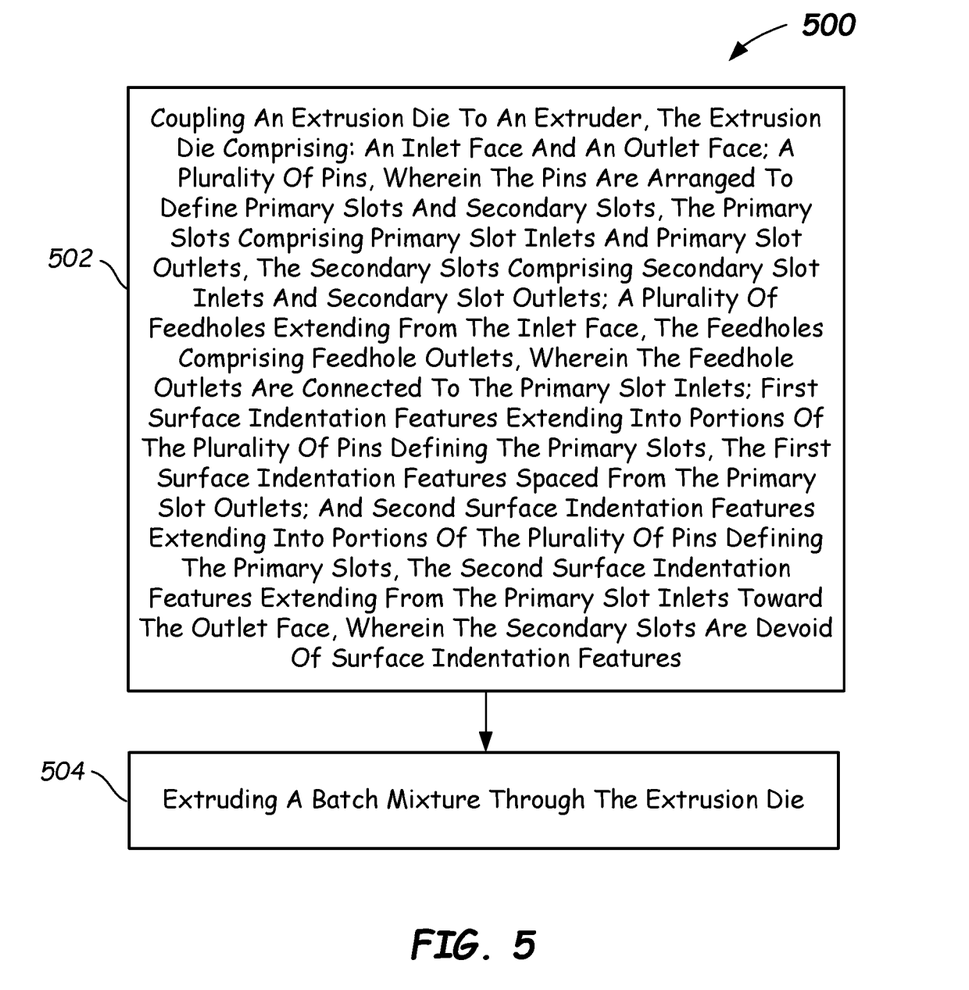
FIG. 5 illustrates a flowchart describing a method of manufacturing a honeycomb structure according to embodiments.

In another aspect, a method of manufacturing a honeycomb body (e.g., green honeycomb body 124) comprising a honeycomb structure (structure of intersecting walls 222) is provided and is described in the flowchart of FIG. 5. The method 500 includes, at step 502, coupling an extrusion die (e.g., honeycomb extrusion die 120) to an extruder (e.g., extruder 100), the extrusion die comprising: an inlet face (e.g. inlet face 315) and an outlet face (e.g., outlet face 341); a plurality of pins (e.g., pins 330), wherein the pins are arranged to define primary slots (e.g., primary slots 312P) and secondary slots (e.g., secondary slots 312S), the primary slots comprising primary slot inlets (e.g., primary slot inlets 312I) and primary slot outlets (e.g., primary slot outlets 312O), the secondary slots comprising secondary slot inlets (e.g., secondary slot inlets 312SI) and secondary slot outlets (e.g., secondary slot outlets 312SO); a plurality of feedholes (e.g., feedholes 313) extending from the inlet face, the feedholes comprising feedhole outlets (e.g., feedhole outlets 319), wherein the feedhole outlets are connected to the primary slot inlets; first surface indentation features (e.g., first surface indentation features—divots 345) extending into portions of the plurality of pins defining the primary slots, the first surface indentation features spaced from the primary slot outlets; and second surface indentation features (e.g., second surface indentation features—plenums 346) extending into portions of the plurality of pins defining the primary slots, the second surface indentation features extending from the primary slot inlets toward the outlet face, wherein the secondary slots are devoid of surface indentation features. The method 500 includes, at step 504, extruding a batch mixture (e.g., batch mixture 316) through the extrusion die.

It will be apparent to those skilled in the art that various modifications and variations can be made in the present disclosure without departing from the scope of the disclosure. For example, the principles of the disclosure can be applied to other types of dies, such as radial dies wherein the circumferential slots can be primary slots and the radial spokes can be the secondary slots. Thus, it is intended that the appended claims cover the modifications and variations of this disclosure provided they come within the scope of the claims and their equivalents.

What is claimed is:

1. A honeycomb extrusion die, comprising:
a die body comprising an inlet face and an outlet face;
a plurality of pins extending from the die body, wherein the pins are arranged to define primary slots and secondary slots, the primary slots comprising primary slot inlets and primary slot outlets, the secondary slots comprising secondary slot inlets and secondary slot outlets;
a plurality of feedholes extending within the die body from the inlet face, the feedholes comprising feedhole outlets, wherein the feedhole outlets intersect the primary slot inlets;
first surface indentation features extending into side surfaces of the plurality of pins defining the primary slots, the first surface indentation features spaced from the primary slot outlets;
second surface indentation features extending into side surfaces of the plurality of pins defining the primary slots, the second surface indentation features extending from the primary slot inlets toward the outlet face; and
wherein the secondary slots are devoid of surface indentation features.

2. The honeycomb extrusion die of claim 1, wherein the secondary slot inlets do not intersect with the feedhole outlets such that only the primary slot inlets intersect with the feedhole outlets.

3. The honeycomb extrusion die of claim 1, wherein the primary slots extend a first depth from the outlet face, wherein the secondary slots extend a second depth from the outlet face, and wherein the first depth is greater than the second depth.

4. The honeycomb extrusion die of claim 1, wherein the second surface indentation features comprise first ends located proximate the primary slot inlets and second ends located opposite the first ends and wherein the secondary slots extend from the outlet face to a depth defined by the second ends.

5. The honeycomb extrusion die of claim 1, wherein the second surface indentation features extend into side surfaces of the plurality of pins defining the primary slots to a depth in a range from 0.15 mm to 0.23 mm.

6. The honeycomb extrusion die of claim 1, wherein the second surface indentation features extend along portions of the plurality of pins defining the primary slots at a length in a range from 0.9 mm to 2.3 mm.

7. The honeycomb extrusion die of claim 1, wherein:
some of the primary slots and some of the secondary slots extend in a first direction;
some of the primary slots and some of the secondary slots extend in a second direction transverse with respect to the first direction;
the secondary slots extending in the first direction intersect with the second surface indentation features of the primary slots extending in the second direction, and
the secondary slots extending in the second direction intersect with the second surface indentation features of the primary slots extending in the first direction.

8. The honeycomb extrusion die of claim 1, wherein the pins have a pin density in a range from 15.5 and 124.0 pins per $cm^2$.

9. The honeycomb extrusion die of claim 1, wherein the pins have a pin density in a range from 58.9 pins per $cm^2$ to 96.1 pins per $cm^2$.

10. The honeycomb extrusion die claim 1, wherein:
some of the primary slots and some of the secondary slots extend in a first direction,
some of the primary slots and some of the secondary slots extend in a second direction transverse with respect to the first direction,
primary slots extending in the first direction intersect primary slots extending in the second direction at primary intersections, and
the feedhole outlets are located at locations defined by at least some of the primary intersections.

11. The honeycomb extrusion die of claim 10, wherein the first direction is orthogonal to the second direction.

12. The honeycomb extrusion die of claim 10, wherein the feedhole outlets are located at all the primary intersections.

13. The honeycomb extrusion die of claim 10, wherein the feedhole outlets are located at alternating ones of the primary intersections in the first direction and the second direction.

14. The honeycomb extrusion die of claim 10, wherein secondary slots extending in the first direction intersect secondary slots extending in the second direction at secondary intersections, and wherein the secondary intersections are devoid of feedhole outlets.

15. The honeycomb extrusion die of claim 1, wherein the primary slots and the secondary slots alternate.

16. The honeycomb extrusion die of claim 1, wherein the primary slots and the secondary slots have widths in a range from 0.051 mm to 0.30 mm.

17. A system comprising an extruder and the honeycomb extrusion die of claim 1, wherein the honeycomb extrusion die is coupled to the extruder.

18. A method of manufacturing a honeycomb structure, comprising:

coupling an extrusion die to an extruder, the extrusion die comprising:
- an inlet face and an outlet face;
- a plurality of pins, wherein the pins are arranged to define primary slots and secondary slots, the primary slots comprising primary slot inlets and primary slot outlets, the secondary slots comprising secondary slot inlets and secondary slot outlets;
- a plurality of feedholes extending from the inlet face, the feedholes comprising feedhole outlets, wherein the feedhole outlets intersect with the primary slot inlets;
- first surface indentation features extending into side surfaces of the plurality of pins defining the primary slots, the first surface indentation features spaced from the primary slot outlets; and
- second surface indentation features extending into side surfaces of the plurality of pins defining the primary slots, the second surface indentation features extending from the primary slot inlets toward the outlet face, wherein the secondary slots are devoid of surface indentation features; and extruding a batch mixture through the extrusion die.

19. A method of manufacturing a honeycomb extrusion die, comprising:
- forming a plurality of pins in a die body comprising an inlet face and an outlet face, wherein the pins are arranged to define primary slots and secondary slots, the primary slots comprising primary slot inlets and primary slot outlets, the secondary slots comprising secondary slot inlets and secondary slot outlets;
- forming a plurality of feedholes extending within the die body from the inlet face, the feedholes comprising feedhole outlets, wherein the feedhole outlets intersected with the primary slot inlets;
- forming first surface indentation features extending into side surfaces of the plurality of pins defining the primary slots, the first surface indentation features spaced from the primary slot outlets; and
- forming second surface indentation features extending into side surfaces of the plurality of pins defining the primary slots, the second surface indentation features extending from the primary slot inlets toward the outlet face, wherein the secondary slots are devoid of surface indentation features.

* * * * *